US008936413B2

(12) United States Patent
Mille et al.

(10) Patent No.: US 8,936,413 B2
(45) Date of Patent: Jan. 20, 2015

(54) APPARATUS AND METHOD FOR INSTALLING A PIPELINE STRUCTURE AT SEA

(75) Inventors: Romain Mille, Plaisir (FR); Brieuc Du Halgouet, Nanterre (FR)

(73) Assignee: Acergy France SA, Suresnes (FR)

( * ) Notice: Subject to any disclaimer, the term of this patent is extended or adjusted under 35 U.S.C. 154(b) by 1 day.

(21) Appl. No.: 13/583,444

(22) PCT Filed: Mar. 7, 2011

(86) PCT No.: PCT/IB2011/000793
§ 371 (c)(1),
(2), (4) Date: Oct. 30, 2012

(87) PCT Pub. No.: WO2011/110950
PCT Pub. Date: Sep. 15, 2011

(65) Prior Publication Data
US 2013/0039701 A1 Feb. 14, 2013

(30) Foreign Application Priority Data
Mar. 9, 2010 (GB) .................................. 1003868.5

(51) Int. Cl.
*F16L 1/20* (2006.01)
*F16L 1/18* (2006.01)
*F16L 1/26* (2006.01)

(52) U.S. Cl.
CPC ... *F16L 1/20* (2013.01); *F16L 1/18* (2013.01); *F16L 1/26* (2013.01)
USPC .......................... 405/172; 405/169; 405/184.4

(58) Field of Classification Search
USPC .............. 405/158, 166, 169, 170, 172, 184.4
See application file for complete search history.

(56) References Cited

U.S. PATENT DOCUMENTS

| 3,732,923 | A | 5/1973 | Fowler |
| 4,051,688 | A | 10/1977 | Ells et al. |
| 4,075,862 | A | 2/1978 | Ames |
| 4,444,528 | A * | 4/1984 | Scodino et al. ............... 405/173 |
| 6,817,808 | B1 * | 11/2004 | Patinet .......................... 405/170 |
| 7,259,918 | B2 | 8/2007 | Matsuoka et al. |
| 7,503,727 | B2 * | 3/2009 | Ingebretsen et al. .......... 405/169 |
| 7,955,028 | B2 * | 6/2011 | Roodenburg et al. ......... 405/166 |
| 2007/0009328 | A1 * | 1/2007 | Bastesen et al. .............. 405/169 |
| 2007/0081862 | A1 | 4/2007 | Wolbers et al. |

(Continued)

FOREIGN PATENT DOCUMENTS

| EP | 0733843 | 9/1996 |
| FR | 2 859 495 | 3/2005 |

(Continued)

*Primary Examiner* — Frederick L Lagman
(74) *Attorney, Agent, or Firm* — Levy & Grandinetti

(57) ABSTRACT

Methods and apparatus for deploying pipeline from a vessel are described in relation to pipelines with installed accessories. One or more accessory support structures are installed at appropriate bedding locations on the seabed. In deploying pipeline from a vessel, an accessory is then attached at a position along the pipeline to correspond with the pre-installed accessory support structure bedding location. The pipeline and attached accessory are deployed and guided into engagement with the pre-installed accessory support structure on the seabed such that the pipeline is deployed substantially horizontally through the accessory support structure, and the accessory is supported by the pre-installed accessory support structure at the bedding location.

19 Claims, 8 Drawing Sheets

(56) References Cited

U.S. PATENT DOCUMENTS

| | | | |
|---|---|---|---|
| 2007/0269270 A1* | 11/2007 | Bastesen et al. | 405/170 |
| 2008/0014026 A1 | 1/2008 | Routeau et al. | |
| 2008/0112762 A1* | 5/2008 | van Zandwijk et al. | 405/166 |
| 2011/0150576 A1* | 6/2011 | Alliot | 405/169 |
| 2012/0269582 A1* | 10/2012 | Fontolan et al. | 405/170 |
| 2013/0309015 A1* | 11/2013 | Mille et al. | 405/168.1 |

FOREIGN PATENT DOCUMENTS

| | | | | |
|---|---|---|---|---|
| GB | 2 382 635 | | 6/2003 | |
| GB | 2487578 | * | 1/2012 | F16L 1/235 |
| WO | WO 99/13258 | | 3/1999 | |

* cited by examiner

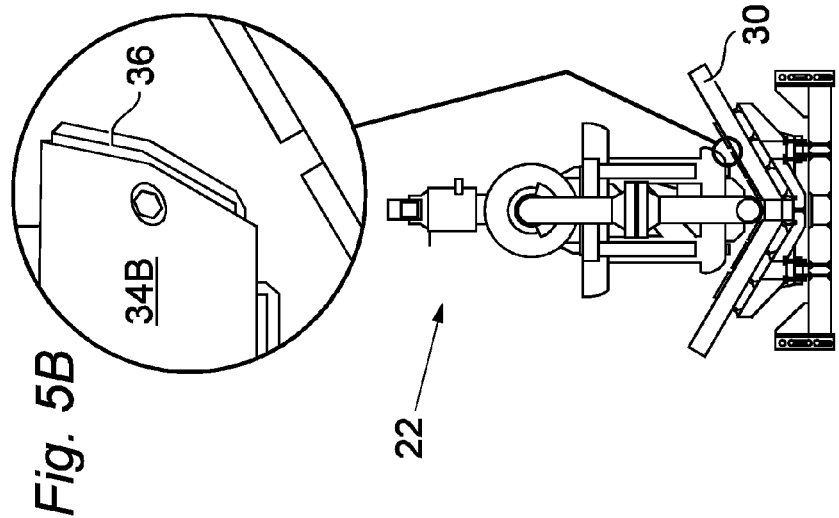
Fig. 5B
Fig. 5A
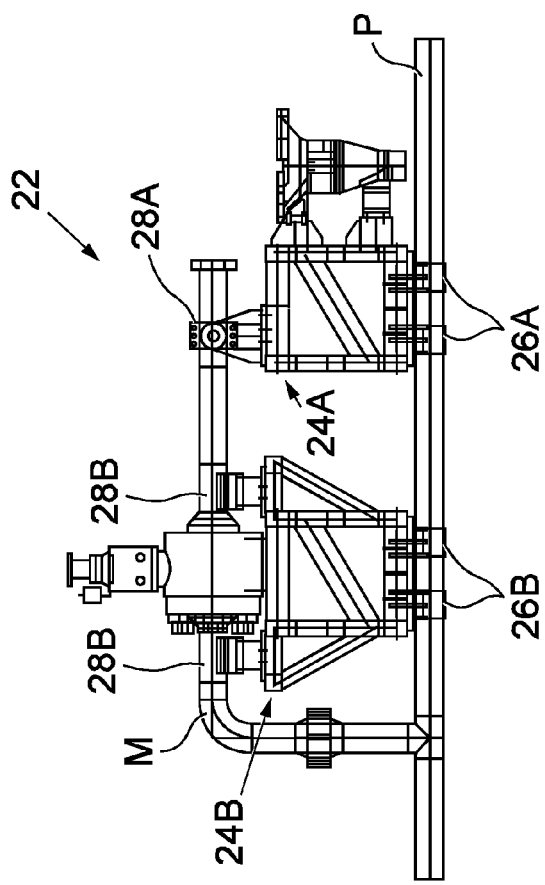
Fig. 3
Fig. 4
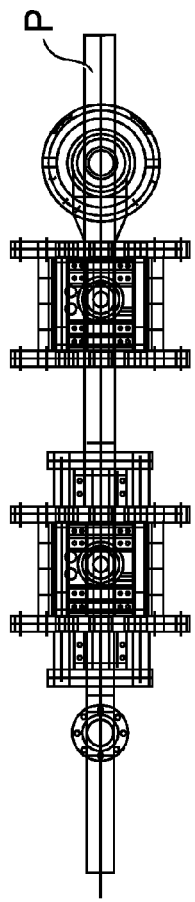

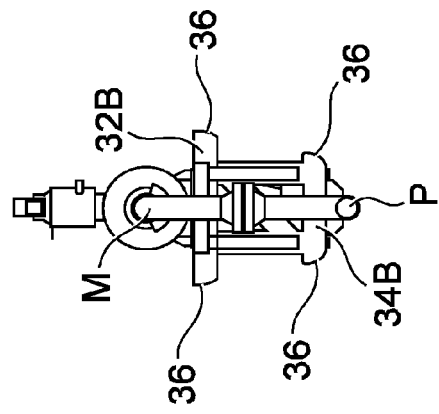
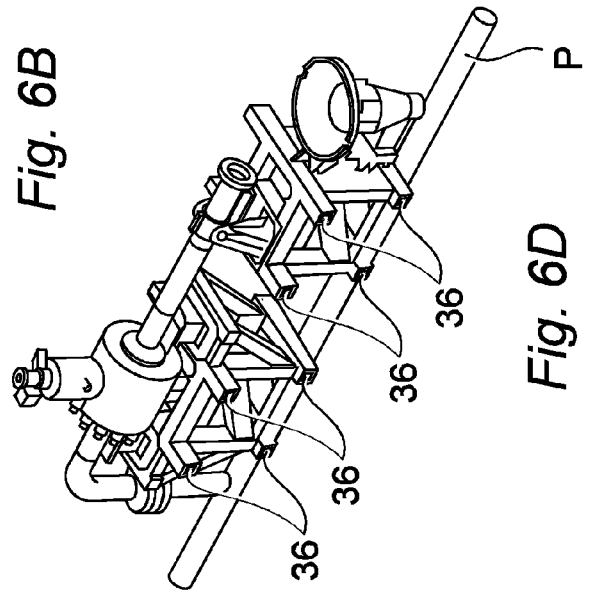
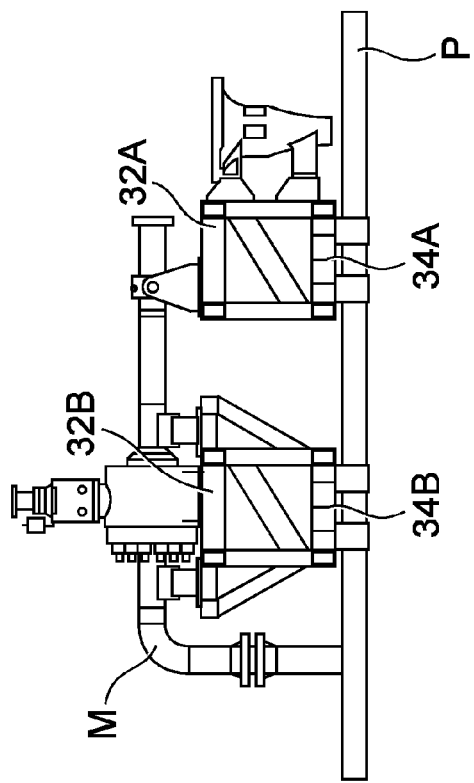
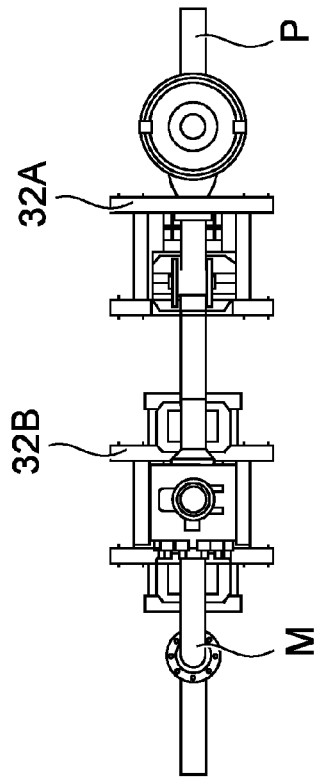
Fig. 6B
Fig. 6D
Fig. 6A
Fig. 6C

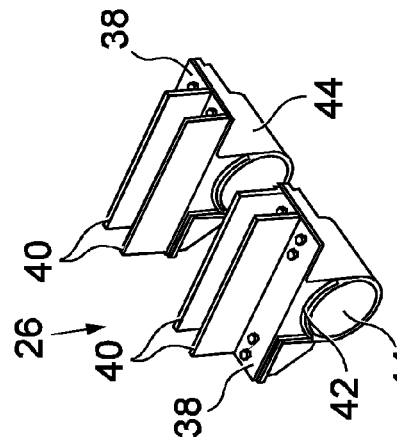
*Fig. 7A*
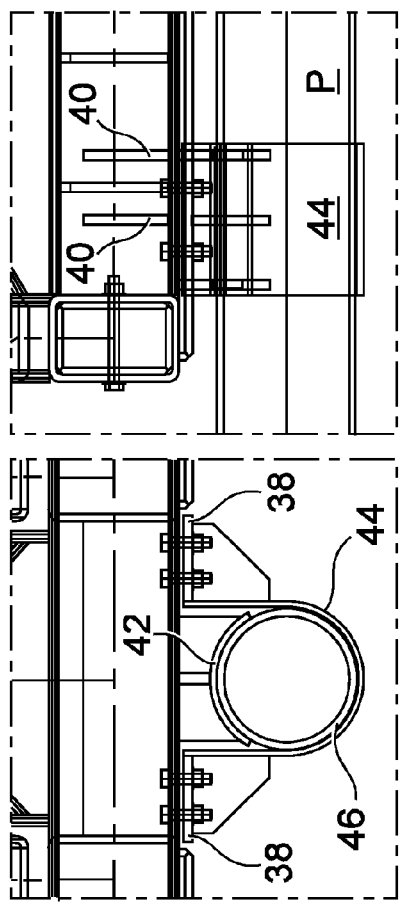
*Fig. 7B*
*Fig. 7C*
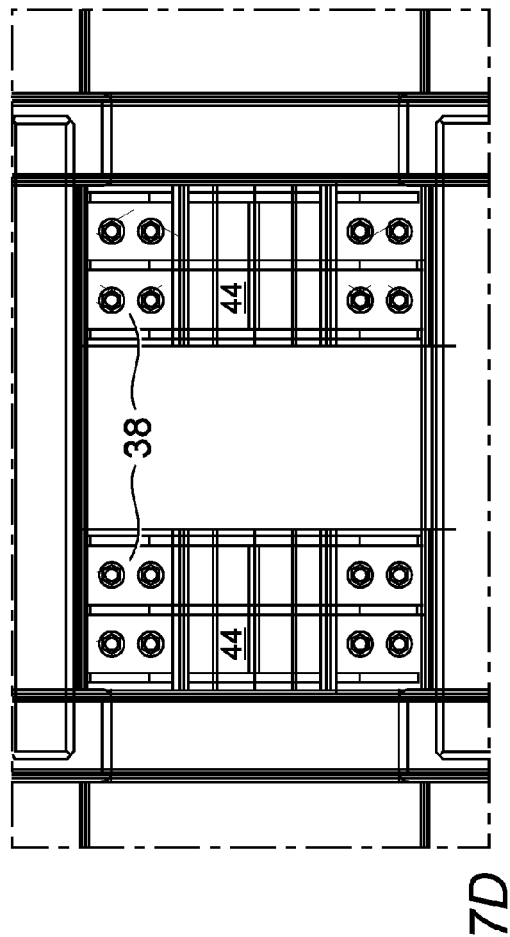
*Fig. 7D*

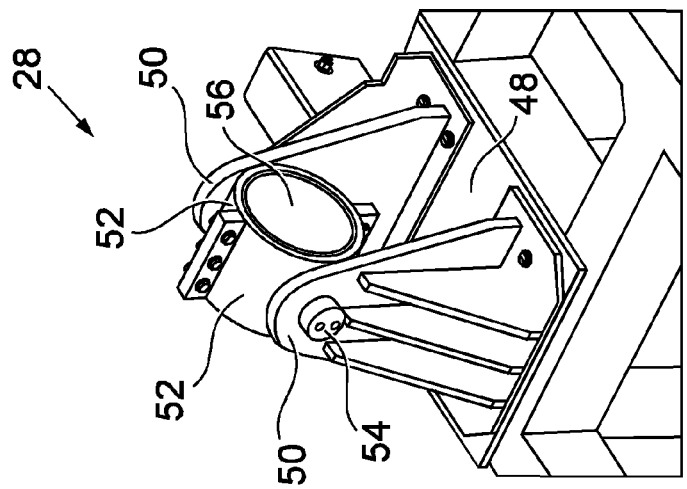
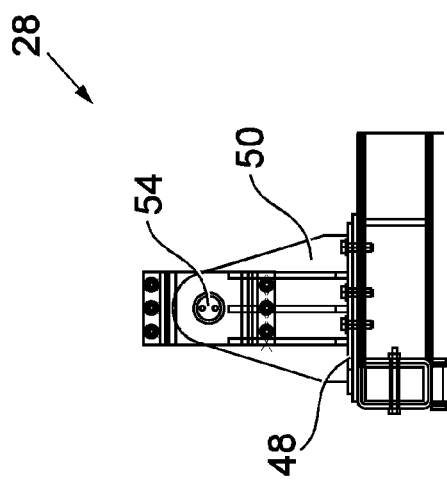
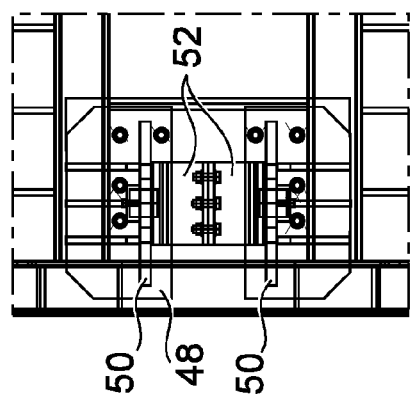
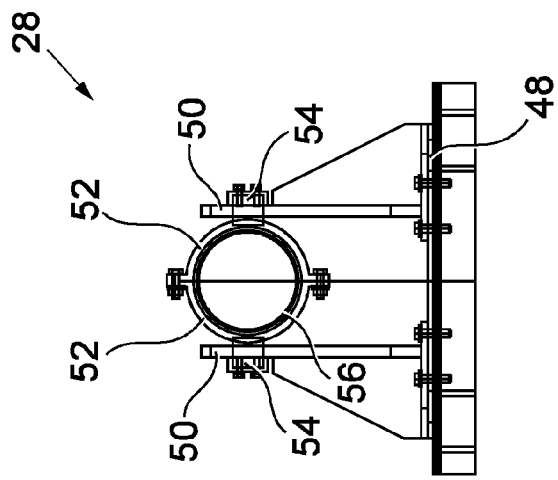

APPARATUS AND METHOD FOR INSTALLING A PIPELINE STRUCTURE AT SEA

This Application is the U.S. National Phase of International Application Number PCT/IP2011/000793 filed on Mar. 7, 2011, which claims priority to Great Britain Application No. 1003868.5 filed on Mar. 9, 2010.

FIELD & BACKGROUND DISCUSSION

The present invention is concerned with apparatus for installing a pipeline structure or pipeline structures at sea, particularly but not exclusively for installing, from a vessel, subsea pipeline accessories (such as pipeline end terminations (PLETs) and in-line tees (ILTs)) having bulky mudmats which support the accessory on the seabed. A method of installing pipeline accessories at sea is also provided.

When laying pipeline from a vessel onto the seabed it is often necessary to provide large mudmats for accessories such as PLETs or ILTs to rest upon while on the seabed. However, on many pipelaying vessels the laying equipment (tensioners, stinger etc.) being used to control deployment of the pipeline from the vessel results in the pipeline laying equipment having a restricted dimension, which limits the maximum size of structure which can pass through it. This therefore limits the size of the mudmat that can be deployed from the vessel without temporarily interrupting the pipelaying process. This is a particular problem for vessel equipped with S-lay pipelaying equipment. The attraction of S-lay methods is their high lay rate, but this is spoiled if the process is interrupted.

One known way of attempting to overcome this problem is the incorporation of folding components into the mud mat which, when folded, reduce its maximum dimension as it passes through the laying equipment. An example of such a folding arrangement is a mud mat provided with folding wings, which are folded inwards as it passes through the laying equipment restriction, and which are then folded out after it has passed the laying equipment restriction. However, such foldable arrangements suffer from a number of additional disadvantages. For example, there is an increase in the complexity and cost of such mudmats because they require additional moving parts compared to fixed dimension mudmats. Furthermore, the folding configurations on such mudmats are designed to reduce its dimension in order that it may pass through the laying equipment as it is deployed from the vessel. However, this folding of the mudmat often results in an increase in the storage area required at the stern of the vessel to store the mudmat prior to deployment. Such arrangements can also be unstable, as the folded mudmats having a relatively high centre of gravity.

Another alternative is to completely bypass the restriction in the laying equipment by passing the PLET or ILT over the side of the vessel away from the laying axis and then recovering it to the laying axis at the other side of the pipelaying equipment. This avoids the mudmat having to pass through the laying equipment altogether; however, handling of such a bulky accessory in this way can be a complex and time consuming operation.

According to the present invention, there is provided a method of deploying pipeline from a vessel having pipelaying equipment, the method comprising:—
    installing an accessory support structure at an appropriate bedding location on the seabed;
    attaching an accessory at a position along the pipeline which, when the pipeline is deployed from the vessel, will correspond with the pre-installed accessory support structure bedding location;
    deploying the pipeline and attached accessory through the pipelaying equipment; and
    guiding the attached accessory into engagement with the pre-installed accessory support structure on the seabed such that the pipeline is deployed substantially horizontally through the accessory support structure and the accessory is supported by the pre-installed accessory support structure at the bedding location.

In this way accessory support structures that are too large to pass all the way through the pipelaying equipment, can be used, without significant interruption in the lay process.

The method of deploying pipeline from the vessel may be performed on a vessel having pipelaying equipment configured to lay pipe in an S-lay pipelaying operation.

The step of attaching accessories at positions along the pipeline may comprise the step of attaching in-line structures, such as an in line tee structures.

The step of attaching accessories at positions along the pipeline may comprise the step of attaching end terminations, such as pipeline end termination structures.

The step of installing the accessory support structure at an appropriate bedding location on the seabed may include the step of deploying a plurality of accessory support structures from the pipelaying vessel in a previous deployment pass of the vessel. Alternatively, the step of installing the accessory support structure at an appropriate bedding location on the seabed may include the step of deploying a plurality of accessory support structures from another vessel, which is not the pipelaying vessel, in a deployment pass of the other vessel prior to passage of the pipelaying vessel.

The step of attaching the accessory at a position along the pipe may involve the steps of:
    measuring the installed position of an accessory support structure;
    aligning the vessel relative to the position of an accessory support structure;
    measuring the length of the pipeline deployed while laying the pipeline along a path leading to the position of the accessory support structure; and
    attaching the accessory to the pipeline at a length along the pipeline that coincides with the expected longitudinal and lateral position of the installed accessory support structure on the seabed.

The step of attaching the accessory at positions along the pipeline may involve clamping portions of the accessory around the pipeline.

The step of deploying the pipeline and attached accessory through the pipelaying equipment may comprise:
    maintaining the accessory in a substantially upright configuration as it is deployed from the vessel towards the seabed.

Maintaining the accessory in a substantially upright configuration may involve supporting the accessory on an angled roller arrangement as the accessory is deployed from the vessel. Maintaining the accessory in the substantially upright configuration may also involve attaching temporary buoyancy aids to the accessory.

The step of guiding each attached accessory into engagement with the associated pre-installed accessory support structure on the seabed may comprise guiding the pipeline and hence the attached accessory into a cradle provided on the accessory support structure.

The step of guiding each attached accessory into engagement with the associated pre-installed accessory support structures on the seabed may further comprise the step of laterally adjusting the position of each accessory by abutting portions of the accessory against a widened and angled mouth of the cradle, and progressing the accessory into the cradle such that the widened and angled mouth guides the accessory towards the centre of the accessory support structures.

The step of guiding each attached accessory into engagement with each associated accessory support structure on the seabed may further comprise the step of longitudinally adjusting the position of the accessory by sliding it on translation means provided between the accessory and the accessory support structure. The translation means may comprise skids provided on portions of the accessory and skids provided on portions of the accessory support structure.

According to the present invention, there is also provided a method of deploying pipeline from a vessel having pipelaying equipment, the method comprising:—
  deploying a plurality of support structures at bedding locations on the seabed;
  attaching a plurality of accessories at positions along the pipeline;
  deploying the pipeline and attached accessories from the vessel; and
  guiding each attached accessory towards an appropriate support structure in a bedding location on the seabed, wherein each said accessory is guided into supporting engagement with the removable support structure at the seabed.

According to the present invention, there is also provided an accessory support structure for supporting a pipeline accessory on a seabed, said support structure comprising a cradle arrangement having a widened and angled mouth for guiding the accessory toward the centre of the accessory support structure as the accessory is lowered thereinto.

In a complementary aspect, the invention provides a support frame for a pipeline accessory for attachment to a pipeline being laid, wherein the support frame is adapted on attachment to the pipeline and deployment from a vessel having pipelaying equipment to be engaged with an accessory support structure as set out above.

In a related aspect, the invention provides apparatus for deploying a pipeline with a pipeline accessory on the seabed, comprising a pipeline accessory mounted in a support frame as set out above and a corresponding accessory support structure as set out above.

The pipelaying equipment may comprise S-lay pipelaying equipment.

The accessories may comprise in-line structures, such as an in line tee structures. The accessories may comprise end termination structures, such as pipeline end termination structures.

The accessory may be provided with a support frame having a relatively wide upper support platform and a relatively narrow lower support platform in order to define an accessory having a tapered support platform profile when viewed along the accessory's longitudinal axis.

The edges of the support platforms may be provided with translation means. The translation means may comprise skid pads.

The accessory may be provided with clamping portions for attaching the accessory to the pipeline being laid. A lower clamping portion may be provided in order to securely clamp the accessory to the pipeline being laid. An upper clamping portion may also be provided in order to securely clamp the accessory to a manifold pipe. The clamping portions may comprise a tubular clamp arrangement. The support frame may have two support frame portions, each with an upper clamping portion and a lower clamping portion.

A resilient collar may be provided on the upper and/or lower clamping portion to improve the grip provided by the clamping portions on the pipeline being laid. The resilient collar may comprise neoprene.

The accessory support structure may have a cradle arrangement comprising a widened and angled mouth for guiding the accessory toward the centre of the accessory support structure as the accessory is lowered thereinto. The widened and angled mouth may have skids adapted to assist progression of the accessory thereinto.

The accessory support structure also preferably comprises a substantially planar mudmat for resting the weight of the accessory support structure on the seabed.

At least a longitudinal support rail may be provided on the planar mud mat to support a portion of the accessory thereon. The height of the, or each, longitudinal support rail is configured to ensure that, when the accessory is attached to the pipeline, sufficient clearance remains between the bottom of the pipeline and the upper mudmat surface. It may be preferable to provide two parallel longitudinal support rails on the mudmat in order to lower the pipe as much as possible and to minimise high points in the pipeline.

The cradle arrangement may be provided as left and right frame members comprising a series of upright frames linked by at least a longitudinal sliding rail spanning between the series of upright frames to allow the accessory to slide along the sliding rails once supported by the cradle arrangement.

It may be preferable to provide an upper longitudinal sliding rail and a lower longitudinal sliding rail on either side of the cradle arrangement. The upper and lower longitudinal sliding rails on one side of the cradle may be laterally spaced apart from those on the other side of the cradle by a distance which coincides with the tapered profile of the accessory frame.

The upper longitudinal sliding rail acts to prevent rotation of the accessory, which could otherwise occur due to forces applied by e.g. a jumper. This is desirable because the lever arm between the two lower longitudinal sliding rails may not be sufficient to prevent rotation (since they must be relatively close together in order to pass through the stinger). The upper longitudinal sliding rails combined with the lower longitudinal sliding rails therefore provide the required support against rotation of the accessory.

Translation means may be provided between the tapered support platform and the accessory support structure in order to assist lateral movement of the accessory with respect to the accessory support structure in service and or during installation. The translation means may comprise skids provided on the tapered support platform of the accessory and a skidding surface provided on the longitudinal sliding rails of the cradle arrangement.

Deployment control means may be provided on the vessel to control deployment of the accessory and pipe from the vessel. The deployment control means may comprise an angled roller arrangement to maintain the attached accessory in an upright configuration as it is being deployed from the vessel. The angled roller arrangement may be provided on a stinger member provided at the rear of the vessel.

In a further aspect, the invention provides apparatus for deploying a pipeline with an installed pipeline accessory from a pipelaying vessel, the apparatus comprising deployment control means provided on the vessel to control deployment of the accessory and pipe from the vessel such that the pipeline accessory is maintained in a substantially upright configuration.

Advantageously, the deployment control means may comprise an angled roller arrangement to maintain the attached accessory in a substantially upright configuration as it is being deployed from the vessel. The apparatus may further comprise buoyancy aids installed temporarily on the pipeline while lowered from the pipelaying vessel to the seabed to maintain the attached accessory in a substantially upright configuration between deployment from the vessel and laying the pipeline on the seabed.

BRIEF DESCRIPTION OF THE DRAWINGS

Embodiments of the invention will now be described, by way of example only, with reference to the accompanying drawings, in which:

FIG. 3 is a transverse view of the in-line accessory installed on the pipeline being laid prior to deployment from the vessel;

FIG. 4 is a plan view of the in-line accessory of FIG. 3;

FIG. 5A is an end view of the in-line accessory on a roller box during deployment from the vessel's stinger arrangement;

FIG. 5B is a more detailed view of a corner of the in-line accessory lower platform adjacent the surface of the roller box;

FIG. 6A is a transverse schematic illustration of the in-line accessory of FIG. 3;

FIG. 6B is a schematic end illustration of the in-line accessory of FIG. 6A;

FIG. 6C is a schematic plan illustration of the in-line accessory of FIG. 6A;

FIG. 6D is a schematic perspective illustration of the in-line accessory of FIG. 6A;

FIG. 7A is a perspective illustration of a lower tube clamp arrangement for attaching the in-line accessory to the pipeline being laid;

FIG. 7B is a transverse view of the tube clamp of FIG. 7A attached to the pipeline being laid;

FIG. 7C is an end view of the tube clamp of FIG. 7A;

FIG. 7D is a bottom view of the tube clamp of FIG. 7A;

FIG. 8A is a perspective illustration of an upper tube clamp arrangement that attaches the support structure of the in-line accessory to a manifold pipe;

FIG. 8B is a transverse view of the tube clamp of FIG. 8A;

FIG. 8C is an end view of the tube clamp of FIG. 8A;

FIG. 8D is a bottom view of the tube clamp of FIG. 8A;

DETAILED DESCRIPTION OF THE EMBODIMENTS

Figure 1:
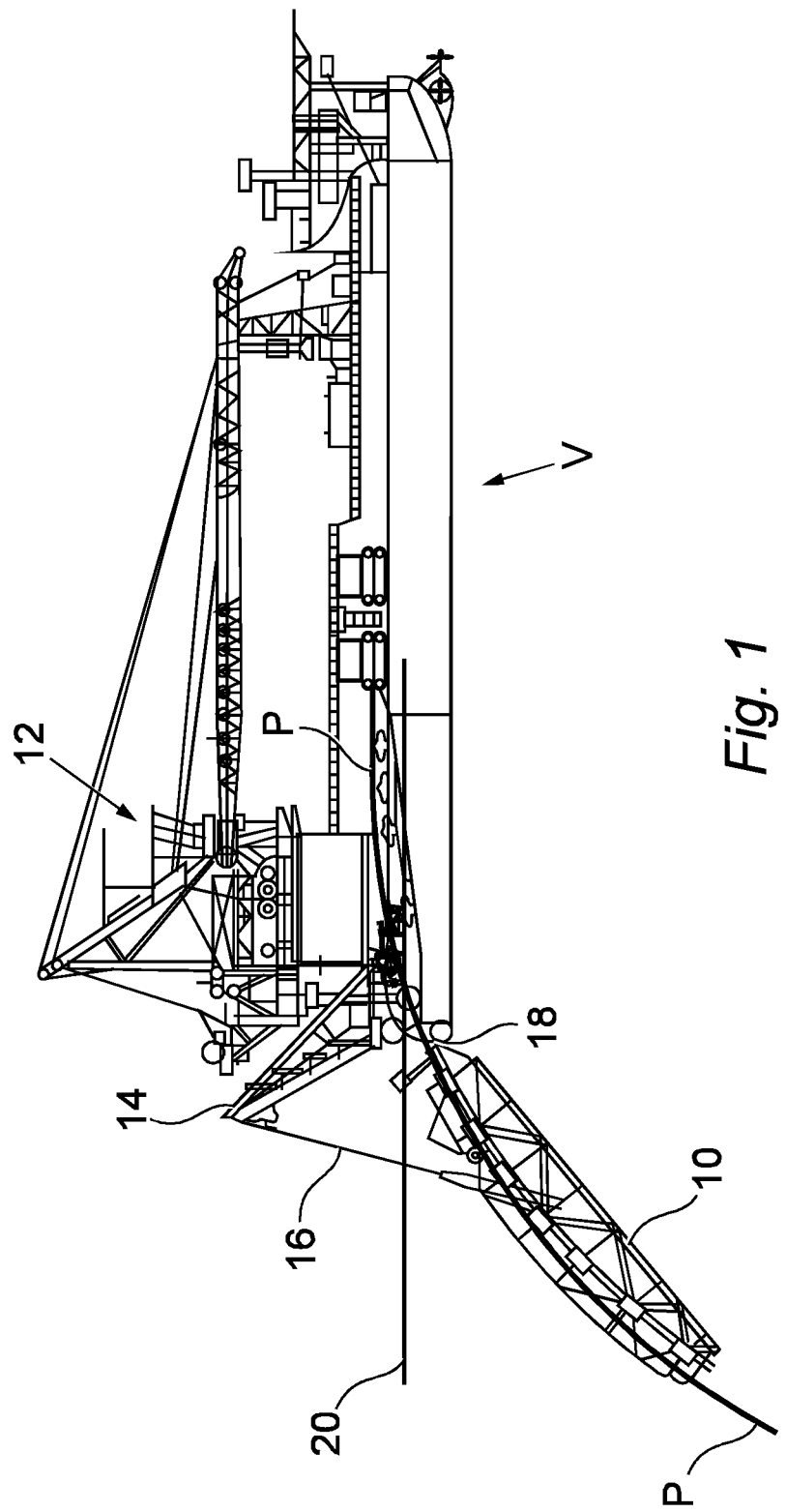
FIG. 1 is an illustration of a pipelaying vessel equipped with S-lay pipelaying equipment and with an in-line accessory installed on the pipe ready for deployment from the stern of the vessel by way of a stinger.

FIG. 1 shows a vessel V provided with pipelaying equipment such as tensioners (not shown) for controlling deployment of the pipeline from the vessel, a stinger arrangement 10 which controls the bend in the pipeline P as it leaves the stern of the vessel V, a crane 12 for manoeuvring pipe sections/other tools and equipment on the vessel V, and a winch tower 14 which extends over the stern of the vessel.

The winch tower 14 has a winch cable 16 which can be reeled in or out to raise or lower the stinger 10. Since the stinger 10 is connected to the stern of the vessel V at pivot point 18, raising and lowering the stinger 10 simultaneously alters its angle relative to the vessel's longitudinal axis and hence alters the degree of bend in the pipeline as it is being laid, dependent upon the depth of the seabed from the surface 20.

Referring to FIGS. 3 and 4, an accessory such as an in line tee (ILT) 22 or a pipeline end termination (PLET) (not shown) is provided with support frames 24A and 24B attached to the pipeline P by lower tubular clamps 26A and 26B. The accessory could be any structure attached to the pipeline that is not pipeline itself. In the embodiment shown, the accessory is an ILT 22, which has a manifold pipe M extending from the main pipeline P. Each of the support frames 24A and 24B are attached to the manifold pipe M by upper tubular clamps 28A and 28B.

Figure 10:
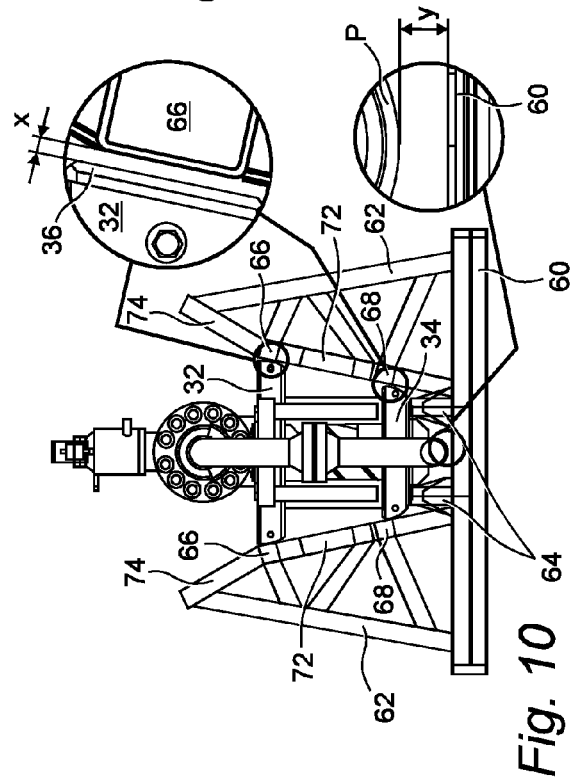
FIG. 10 is an end view of the mudmat and support cradle in supporting engagement with the in-line accessory at the seabed.

The lower tubular clamps 26A and 26B connect the pipeline P and the accessory so that the pipeline P is held slightly above the upper surface of the mat platform 60 when installed (see e.g. FIG. 10).

Referring to FIGS. 5A and 5B, the stinger 10 may be provided with a roller box 30, which has angled wings to further guide the ILT 22 down the stinger 10 in an upright configuration. The ILT 22 is maintained in a vertical orientation in the water during installation and when on the stinger 10 with temporary buoyancy aids (not shown). This process is further facilitated by vertical roller boxes (not shown) provided toward the tail end of the stinger 10 which maintain the ILT 22 vertical and keep the pipeline P and the attached ILT 22 laterally aligned in the stinger 10. The reduced dimensions of the ILT 22 in this arrangement allow it to pass through these vertical roller boxes.

Each support frame 24A, 24B has lattice support work that provides a high degree of structural rigidity for a relatively low weight. As best illustrated in FIGS. 5A and 6B, each frame 24A, 24B has an upper platform 32 and a lower platform 34. The upper platform 32 is slightly wider than the lower platform 34 in order to define a tapered profile when viewed from the end of the ILT 22. Skid pads 36 are provided at either side of the upper and lower platforms 32, 34. As best seen in FIG. 5B, the skid pads 36 have a bevelled profile. The bevelled profile provides two differently angled contact surfaces for impacting against the angled contact surfaces on the upper inner supports 74 and the lower inner supports 72/end of the longitudinal spar 66 during installation of the ILT 22 in the mud mat arrangement 58.

Referring to FIGS. 7A to 7D and FIGS. 8A to 8D the attachment between the ILT 22 and the pipeline P provided by the upper tubular clamps 26A, 26B and the lower tubular clamps 28A, 28B will now be described.

Each lower tubular clamp 26 has an attachment plate 38 with attachment portions 40, for securing the clamp 26 to its respective support frame 24, and an inner curved pipe receiving surface 42. A removable curved pipe clamp portion 44 is releasably secured to the attachment plate 38 and may be provided on a hinging mechanism. The lower tubular clamp 26 and hence the support frame 24 may be attached to the pipeline P by resting the curved surface 42 on top of the pipeline P, placing the pipe clamp portion 44 on the other side of the pipeline P in order to close around the pipeline P and then securing the pipe clamp portion 44 to the attachment plate 38 with securing bolts. Once the securing bolts have been tightened, the tubular clamp 26 will grip the pipeline P securely. A collar of resilient material 46 may be provided on the inner circumference of the lower tubular clamp 26 in order to improve the grip that can be obtained on the pipeline P. An example of a suitable resilient material for the collar is neoprene; however, many other forms of resilient material could alternatively be used.

Each upper tubular clamp 28 has an attachment plate 48 for securing the upper tubular clamp 28 to the top of its support frame 24. The upper tubular clamp has a pair of half pipe, removable clamp collars 52 which are provided between the upright supports 50 and which provide a clamping collar when clamped to one another. The resulting clamping collar is pivotally mounted to the uprights 50 by way of pivot joints 54 provided on either side thereof. Once the half-pipe clamp collars 52 are tightened around the manifold pipe M, they grip the pipe M securely. A collar 56 of resilient material may be provided on the inner circumference of the resulting tubular clamp in order to improve the grip obtained by the clamp on the manifold pipe M. Again, an example of a suitable resilient material for the collar 56 is neoprene; however, many other forms of resilient material could alternatively be used.

The upper tubular clamps 28A; 28B and the lower tubular clamps 26A; 26B therefore provide a secure connection between the support frames 26A, 26B, the pipeline P being laid, the manifold pipe M and any other components of the ILT 22.

In S-lay, the pipeline will flex in adopting the S-shaped profile characteristic of S-lay. This flexure is affected by the presence of the ILT 22. However, the use of two support frames allows for some flexure in the pipeline even where the ILT 22 is supported because of the possibility of relative motion between the frames. Use of two lower tubular clamps 26A, 26B allows for flexure of the pipeline between clamping positions, and similarly use of two upper tubular clamps 28A, 28B allows for flexure of the manifold pipe M between clamping positions.

Figure 9C:
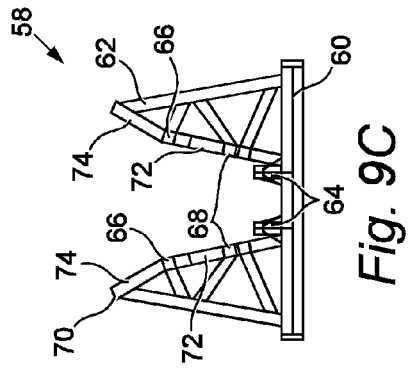
FIG. 9C is an end view of the pre-installed mudmat and support cradle of FIG. 9A.
Figure 9A:
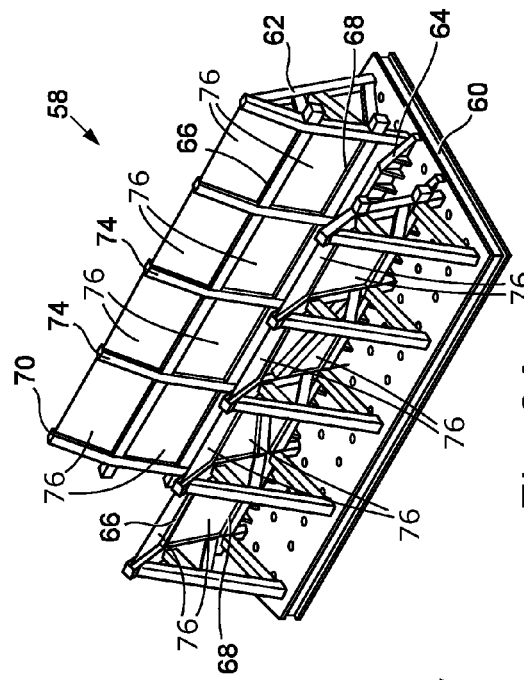
FIG. 9A is a perspective schematic view of a pre-installed mudmat and support cradle.
Figure 9B:
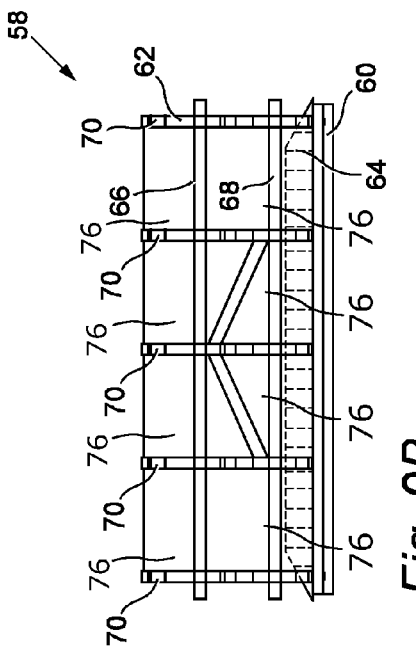
FIG. 9B is a transverse view of the pre-installed mudmat and support cradle of FIG. 9A.

An accessory support structure having a mudmat arrangement 58 that has been pre-installed at a bedding location on the seabed prior to deployment of the pipeline P from the vessel V will now be described with particular reference to FIGS. 9A to 9C. Although a single mudmat arrangement 58 is shown in FIGS. 9A to 9C, a number of mudmat arrangements (each having at least one dimension which is too large to pass through the pipelaying equipment at the stern of the vessel) will typically have been pre-installed at a number of bedding locations on the seabed prior to deployment of the pipeline P. The bedding locations are carefully chosen by the operator to coincide with the direction and position of the various PLET or ILTs required on the eventual pipeline laid.

Mudmat arrangement 58 comprises a mat platform 60 and an accessory support cradle 62. The mat platform 60 has a pair of longitudinal support rails 64, which run along the length of the platform 60. The longitudinal support rails 62 have a tapered guide end. Each side of the support cradle 62 has an upper longitudinal spar 66 and a lower longitudinal spar 68 which extend along the support cradle 62 and which are supported by a series of frames 70 (five frames are shown in the embodiment, as best seen in FIG. 9B, however many more or fewer could be provided as required). Plates 76 are provided on the frames 70 to provide a continuous surface, rather than gaps between frame members, behind the longitudinal spars. As is best illustrated in FIG. 10, lower inner supports 72 of the frames 70 are spaced from one another and angled relative to the platform 60 such that the distance between the left and right lower longitudinal spars 68 corresponds closely with the width of the ILT 22 lower support platforms 34 and the distance between the left and right upper longitudinal spars 66 corresponds closely with the width of the ILT 22 upper support platforms 32. This results in only a small eventual clearance (indicated as X in FIG. 10) between the ILT 22 and the support cradle 62 of the mud mat arrangement 58 once they are engaged with one another, as will be described subsequently. This provides a degree of fabrication tolerance and assists with longitudinal translation (by avoiding the accessory becoming stuck in the support structure—the plates 76 also serve to prevent this from happening).

The upper longitudinal spar 66 (or sliding rail) prevents rotation of the accessory, which may otherwise occur due to forces applied by e.g. a jumper. This is desirable because the lever arm between the two lower longitudinal spars 68 (or sliding rails) may not be sufficient to prevent rotation (since they must be relatively close together in order to pass through the stinger). The upper longitudinal spars 66 combined with the lower longitudinal spars 68 on either side of the apparatus therefore provide the required support against rotation around the longitudinal axis of the pipeline.

The height of the longitudinal support rails 64 underneath the ILT 22 is selected to ensure that the pipeline P attached to the lower tubular clamps 26A and 26B sufficiently clears the upper surface of the platform 60 (by a distance indicated Y in FIG. 10).

Upper inner supports 74 are angled relative to the surface of mud mat platform 60 to a greater extent than the lower inner supports 72. This results in the lower part of the cradle 62 having a taper which neatly accommodates the tapered width of the ILT 22 and the upper part of the cradle 62 having a widened mouth which guides the ILT 22 as it is lowered into the cradle 62.

In use, when a section of pipeline P is to be laid from a vessel, the following procedure is adopted.

A number of accessory support structures such as mudmat arrangements 58, being ill suited to passage through the pipelaying equipment, are either deployed by the vessel V in a first mudmat deployment pass or are deployed by another vessel prior to passing of the vessel V. Because no actual laying of the pipe on the seabed is typically performed during this first pass, there is no pipelaying equipment to restrict deployment of the accessory support structures from the vessel. This allows the mudmat arrangements 58 (which may support PLETs or ILTs or other accessories) to be pre-installed on the seabed at the appropriate bedding locations relatively easily and quickly. As has already been suggested, the present description and drawings illustrate the step of installing an ILT accessory; however, the method can clearly also be used for installing other pipeline accessories which are either too big or time consuming to install through the pipelaying equipment or which would cause undue stress to the pipeline if they were passed through the pipelaying equipment. Thus, normally all accessory support structures are therefore pre-installed at bedding locations on the seabed prior to beginning the step of laying the pipeline accessories such as the ILT/PLET arrangements.

Pre-positioning of the accessory support structures at the bedding locations on the seabed can be done in a number of ways. For example, in shallow water (typically less than 50 m depth) GPS vessel positioning can be used; in intermediate depths (typically between 50 m and 500 m depth) the required distances between the structures can be calculated using transponders; in deep water (typically greater than 500 m depth) the positions can be ascertained by direct measurement using an ROV and or intermediate station(s).

With the mudmat arrangements 58 accurately positioned at their bedding locations on the seabed, the vessel V is then set up to lay pipeline P from its stinger 10 and other pipelaying equipment. As the pipeline P is deployed from the vessel V the vessel's position on the surface 20 relative to the pre-installed mud mat arrangements 58 on the seabed may be controlled and monitored with accurate vessel positioning systems. The length of the pipeline P deployed may be monitored to determine the point along the pipeline P at which an ILT or PLET requires to be attached to the pipeline P as it is being laid from the vessel V. The attachment point is calculated to be the point along the pipeline P which will eventually coincide with the location of the pre-installed mudmat arrangement 58 once that section of pipeline P has been deployed from the vessel V and descended to the seabed through the S shaped bend in the pipeline P. Once the attachment point has been noted, the ILT 22 is attached to the pipeline P on board the vessel V at that location. This requires clamping of the lower tubular clamps 28A and 28B around the pipeline P.

Figure 2:
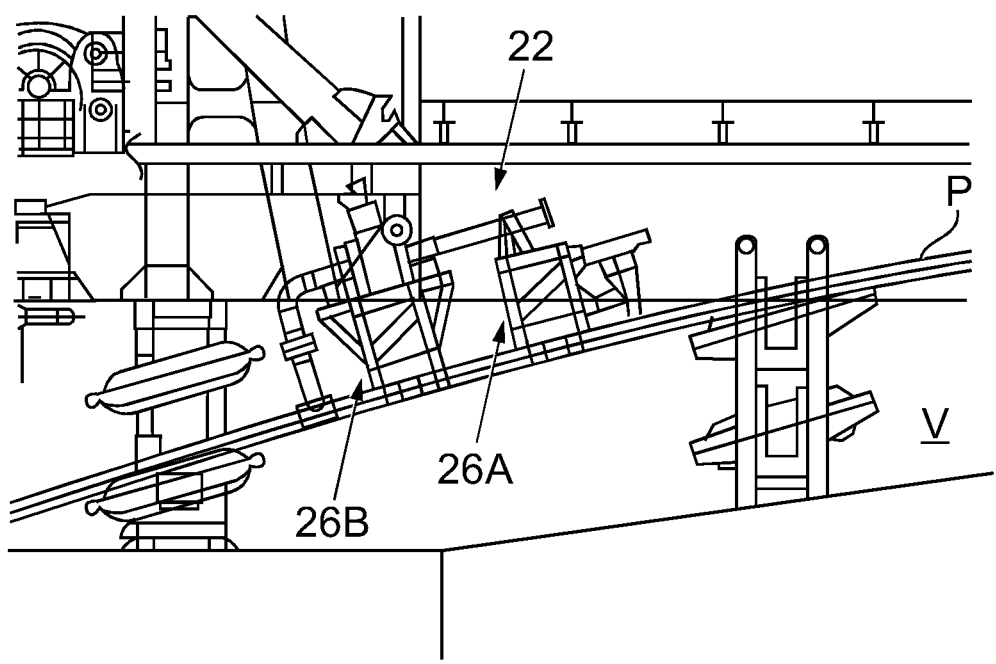
FIG. 2 is a more detailed view of the in-line accessory positioned on the pipe toward the stern of the vessel of FIG. 1.

Continued deployment of the pipeline P from the vessel V will therefore progress the ILT 22 toward the stern of the vessel V as shown in FIGS. 1 and 2. When the ILT reaches the stinger 10 it is kept in an upright position using the roller box 30.

Once the ILT 22 on the pipeline P has left the rear of the stinger 10 it will begin to descend toward the seabed along the S shaped bend that is typical of S-laying operations. During this phase of deployment in order to avoid any tendency for the ILT 22 to twist away from its upright configuration the ILT 22 is held vertical by temporary buoyancy aids (not shown) whilst being lowered through the water; these also reduce the overall weight of the ILT 22 on the pipe catenary during deployment.

If the vessel's positioning systems have maintained correct directional control of the vessel V (and hence the pipeline P being deployed) when the ILT 22 on the pipeline P approaches the seabed it should be directly above the mouth of one of the pre-installed mudmat arrangements 58.

Ideally, continued deployment of the pipeline P from the vessel V will now allow the ILT 22 to rest down into the cradle 62 without any positional readjustment being required. As the ILT 22 progresses into the cradle 62, the bottom of the lower support platforms 34 will come into contact with, and eventually rest upon, the longitudinal support rails 64. At the same time, the skid pads 36 of the lower support platforms 34 will rest against the lower longitudinal spar 66 and the skid pads 36 of the upper support platforms 32 will rest against the upper longitudinal spar 68.

Lateral positional freedom is built into the method and apparatus as a result of the widened cradle mouth formed by the upper inner supports 74. This produces a widened lateral target area within which the ILT 22 must end up as it approaches the seabed. Therefore, if the ILT 22 is slightly to the left or right of the cradle 62 centreline, the skid pads 36 on the lower platform 34 will first abut against the inside of one of the inner upper supports 74. Continued descent of the ILT 22 will cause the skid pads 36 to slide down the support 74. The angle of the supports 74 guides the ILT 22 towards the centreline of the cradle 62. Once the upper inner supports 74 have guided the ILT 22 toward the centre line, the ILT 22 will continue to be centred by the angle of the lower inner support 72 as the ILT 22 continues to descend into the cradle 62, until the bottom of the lower platform 34 comes into contact with, and eventually rests upon the longitudinal support rails 64.

Figure 11A:
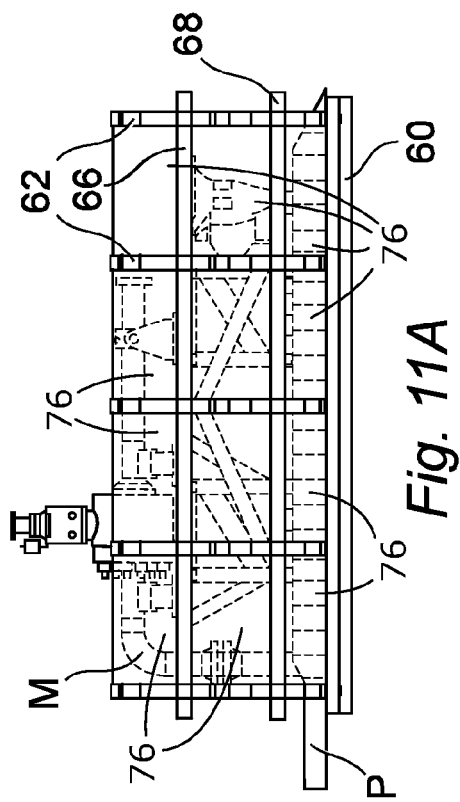
FIG. 11A is a transverse schematic view of the in-line accessory engaged with and supported by the pre-installed mudmat and connected to the laid pipeline.
Figure 11B:
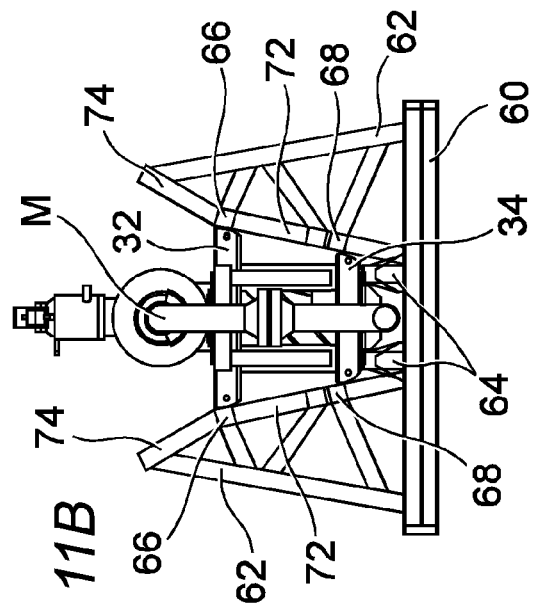
FIG. 11B is a schematic end view of the in-line accessory and pre-installed mudmat of FIG. 11A.
Figure 11C:
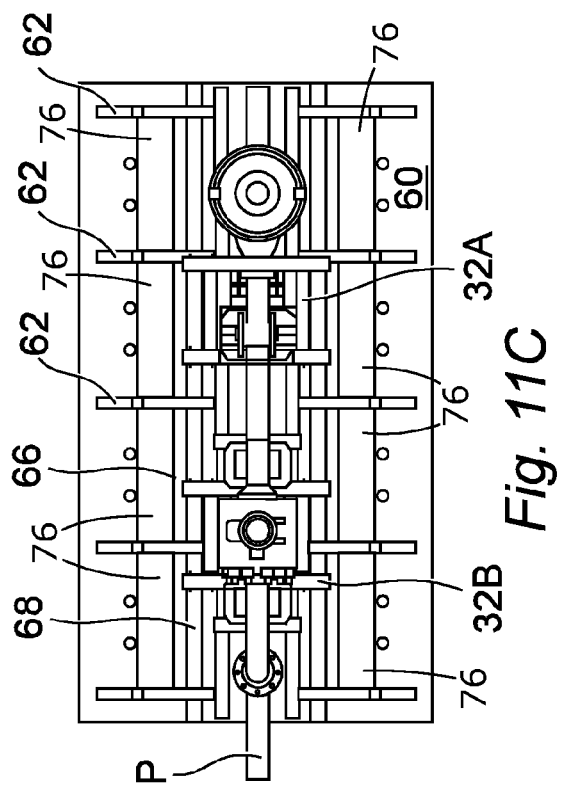
FIG. 11C is a schematic plan view of the in-line accessory and pre-installed mud mat of FIG. 11A.
Figure 11D:
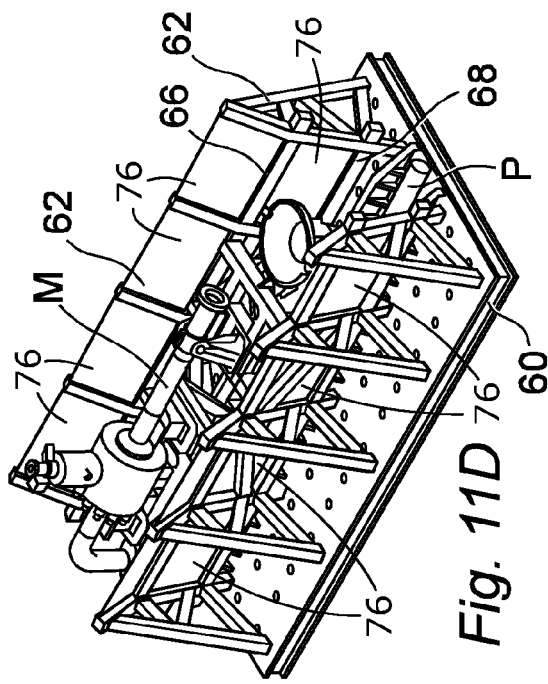
FIG. 11D is a schematic perspective view of the in-line accessory and pre-installed mudmat of FIG. 11A.

As best seen in e.g. FIG. 11C, longitudinal positional freedom is built into the system as a result of the mud mat arrangement 58 being significantly longer than the length of the ILT 22. Therefore, if the ILT 22 is slightly forward or backward of the longitudinal centre of the cradle 62, it will still be supported by the cradle 62. In this regard, the engagement between the skid pads 36, the upper longitudinal spar 66 and the lower longitudinal spar 68 as well as the longitudinal support rails means that the ILT 22 can be slid along the mud mat arrangement 58 once it is in position. This can be used to adjust the position of the ILT 22 as it engages with the cradle 62 and/or to allow the ILT 22 to translate back and forth with respect to the bedded mud mat arrangement 58 when in service on the seabed. This helps to reduce the stress and strain on the laid pipeline P whilst minimising any high points along the length of the pipeline P.

Once the mudmat arrangements 58 have been pre-installed on the seabed, the method and apparatus of the invention therefore allows the pipelaying vessel V to perform a non-stop pipelaying operation.

Modifications and improvements may be made to the foregoing with departing from the spirit and scope of the invention.

The invention claimed is:

1. A method of deploying pipeline from a vessel having pipelaying equipment, the method comprising:
   installing an accessory support structure at a bedding location on a seabed;
   on the vessel, attaching an accessory at a position along the pipeline and between a first end of the pipeline and a second end of the pipeline such that, when the pipeline is deployed from the vessel, the position of the accessory along the pipeline corresponds with the bedding location at which the accessory support structure is installed;
   deploying the pipeline and the attached accessory into water through the pipelaying equipment; and
   before deploying the second end of the pipeline from the vessel, guiding the attached accessory under water into engagement with the accessory support structure installed at the bedding location on the seabed such that the pipeline is deployed substantially horizontally through the accessory support structure and the accessory is supported at a position intermediate along the length of the pipeline by the accessory support structure installed at the bedding location.

2. A method of deploying pipeline as claimed in claim 1, wherein the step of attaching accessories at positions along the pipeline comprises the attaching of an accessory consisting of an in-line structure.

3. A method of deploying pipeline as claimed in claim 1, wherein the step of installing the accessory support structure comprises deploying a plurality of accessory support structures either from the vessel having pipelaying equipment or from another vessel in a previous deployment pass.

4. A method of deploying pipeline as claimed in claim 1, wherein the step of attaching the accessory at a position along the pipeline involves the steps of:

measuring the bedding location of the accessory support structure;

aligning the vessel relative to the bedding location of the accessory support structure;

measuring a length of the pipeline deployed while laying the pipeline along a path leading to the bedding location of the accessory support structure; and attaching the accessory to the pipeline at a length along the pipeline which coincides with an expected longitudinal and lateral position of the accessory support structure installed at the bedding location on the seabed.

5. A method of deploying pipeline as claimed in claim 4, wherein the step of attaching the accessory at a position along the pipeline includes clamping portions of the accessory around the pipeline.

6. A method of deploying pipeline as claimed in claim 1, wherein the step of deploying the pipeline and the attached accessory through the pipelaying equipment comprises maintaining the accessory in a substantially upright configuration as it is deployed from the vessel towards the seabed.

7. A method of deploying pipeline as claimed in claim 6, wherein maintaining the accessory in a substantially upright configuration includes the step of supporting the accessory on an angled roller arrangement as the accessory is deployed from the vessel.

8. A method of deploying pipeline as claimed in claim 6, wherein maintaining the accessory in a substantially upright configuration includes the step of attaching temporary buoyancy aids to the accessory.

9. A method of deploying pipeline as claimed in claim 1, wherein the step of guiding the attached accessory into engagement with the accessory support structure installed at the bedding location on the seabed comprises guiding the pipeline and hence the attached accessory into a cradle provided on the accessory support structure.

10. A method of deploying pipeline as claimed in claim 1, wherein the step of guiding the attached accessory into engagement with the accessory support structure installed at the bedding location on the seabed comprises the step of laterally adjusting the position of each accessory by abutting portions of the accessory against a widened and angled mouth of a cradle of the accessory support structure, and progressing the accessory into the cradle such that the widened and angled mouth guides the accessory towards the center of the accessory support structure.

11. A method of deploying pipeline as claimed in claim 10, wherein the step of guiding the attached accessory into engagement with the accessory support structure installed at the bedding location on the seabed further comprises the step of longitudinally adjusting the position of the accessory by sliding the accessory along the accessory support structure.

12. A method of deploying pipeline from a vessel having pipelaying equipment, the method comprising:

deploying a plurality of accessory support structures at bedding locations on the seabed;

on the vessel, attaching to a pipeline a plurality of accessories at positions along the pipeline, at least one of which positions lies between a first end of the pipeline and a second end of the pipeline;

deploying the pipeline and the plurality of accessories attached to the pipeline into water from the vessel; and before deploying the second end of the pipeline from the vessel, guiding each accessory of the plurality of accessories attached to the pipeline into water at positions that lie between a first end of the pipeline and a second end of the pipeline toward a corresponding accessory support structure of the plurality of accessory support structures, wherein each said accessory is guided into supporting engagement by the corresponding accessory support structure deployed at the seabed.

13. A method of deploying pipeline as claimed in claim 12, wherein each accessory of the plurality of accessories is maintained in a substantially vertical configuration from deployment from the vessel to engagement with the corresponding accessory support structure.

14. A support frame for a pipeline accessory attached to a pipeline between a first end of the pipeline and a second end of the pipeline, wherein the support frame is adapted for attachment to the pipeline accessory while a pipeline is being laid and is further adapted to support the pipeline accessory when the pipeline has been deployed, the support frame comprising clamping portions for attaching the pipeline accessory to the pipeline being laid and one or more support platforms for engagement with an accessory support structure installed at a bedding location on the seabed, the support frame having a wider upper support platform and a narrower lower support platform defining a tapered support platform profile with respect to a longitudinal axis of the pipeline accessory.

15. A support frame for a pipeline accessory attached to a pipeline between a first end of the pipeline and a second end of the pipeline, wherein the support frame is adapted for attachment to the pipeline accessory while a pipeline is being laid and is further adapted to support the pipeline accessory when the pipeline has been deployed, the support frame comprising clamping portions for attaching the pipeline accessory to the pipeline being laid and one or more support platforms for engagement with an accessory support structure installed at a bedding location on the seabed, wherein the clamping portions comprise a lower clamping portion in order to securely clamp the accessory to the pipeline being laid, laid and an upper clamping portion in order to securely clamp the pipeline accessory to a manifold pipe.

16. A support frame for a pipeline accessory as claimed in claim 15, further comprising a resilient collar provided on the upper and/or lower clamping portion to improve the grip provided by the clamping portions on the pipeline being laid.

17. A support frame for a pipeline accessory as claimed in claim 15, wherein the support frame comprises at least two support frame portions, and wherein each support frame comprises a lower clamping portion and an upper clamping portion.

18. A mounting system for deploying a pipeline with a pipeline accessory on the seabed, the mounting system comprising:

a pipeline accessory for attachment to a pipeline between a first end of the pipeline and a second end of the pipeline, wherein the pipeline accessory is an in-line structure;

a support frame attached to the pipeline accessory, the support frame comprising clamping portions and a support platform, wherein the support frame has a wider upper support platform and a narrower lower support platform defining a tapered support platform profile with respect to a longitudinal axis of the pipeline accessory, further comprising skids provided on the lower support platform of the accessory; and an accessory support structure installed at a bedding location on the seabed, wherein said support structure comprises a cradle having a widened and angled mouth for guiding the pipeline accessory toward the center of the accessory support structure as the pipeline accessory is lowered thereinto for engagement between the support frame and the accessory support structure, the accessory support structure further comprising a skidding surface provided on the longitudinal sliding rails of the cradle;

whereby the skids and the skidding surface are adapted to assist longitudinal movement of the accessory with respect to the accessory support structure in service and/or during installation.

19. A mounting system as claimed in claim 18, the accessory support structure further comprising an upper longitudinal sliding rail and a lower longitudinal sliding rail on either side of the cradle, the upper and lower longitudinal sliding rails on one side of the cradle being laterally spaced apart from those on the other side of the cradle by a distance which coincides with a tapered profile of the support frame.

\* \* \* \* \*